United States Patent
Xiao et al.

(10) Patent No.: US 9,391,664 B2
(45) Date of Patent: Jul. 12, 2016

(54) MOBILE PHONE COVER WITH MECHANICAL KEYBOARD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Zhi-Ming Xiao, Shenzhen (CN); Wei-Min Yang, Shenzhen (CN)

(73) Assignees: Fu Tai Hua Industry (Shenzhen) Co., Ltd., Shenzhen (CN); HON HAI PRECISION INDUSTRY CO., LTD., New Taipei (JP)

( * ) Notice: Subject to any disclaimer, the term of this patent is extended or adjusted under 35 U.S.C. 154(b) by 0 days.

(21) Appl. No.: 14/789,016

(22) Filed: Jul. 1, 2015

(65) Prior Publication Data

US 2016/0105208 A1   Apr. 14, 2016

(30) Foreign Application Priority Data

Oct. 13, 2014   (CN) .......................... 2014 1 0537166

(51) Int. Cl.
*H04M 1/00* (2006.01)
*H04B 1/3888* (2015.01)
*H04M 1/725* (2006.01)

(52) U.S. Cl.
CPC .......... *H04B 1/3888* (2013.01); *H04M 1/72575* (2013.01)

(58) Field of Classification Search
CPC ............................ H04B 1/3883; H04B 1/3888
USPC ............ 455/575.8, 575.1, 575.3, 90.3, 556.1, 455/552.1, 41.1, 41.2, 557, 566, 550.1, 455/573; 361/679.55, 679.17, 679.09; 200/5 A; 206/736; 312/223.2; 345/169, 345/173

See application file for complete search history.

(56) References Cited

U.S. PATENT DOCUMENTS

| | | | | |
|---|---|---|---|---|
| 8,866,747 B2 * | 10/2014 | Ladouceur | ............ | G06F 3/0488 345/168 |
| 8,989,825 B1 * | 3/2015 | Rao | ......................... | G06F 21/32 361/679.55 |
| 2005/0104855 A1 * | 5/2005 | Grossmeyer | .......... | G06F 1/1632 345/169 |
| 2007/0080954 A1 * | 4/2007 | Griffin | .................... | G06F 3/023 345/173 |
| 2007/0287391 A1 * | 12/2007 | Hofer | .................... | G06F 3/0219 455/90.3 |

(Continued)

*Primary Examiner* — Tan H Trinh
(74) *Attorney, Agent, or Firm* — ScienBiziP, P.C.

(57) ABSTRACT

A mobile phone cover with mechanical keyboard is provided. The mobile phone cover includes a top cover, a bottom cover and a connecting assembly connecting the top cover and the bottom cover. The top cover and the bottom cover cooperatively define a receiving space for receiving a mobile phone. The top cover includes a first communication unit. The bottom cover includes a second communication unit. The top cover communicates with the bottom cover via the first communication unit and second communication unit. The mobile phone cover further includes a mechanical keyboard module. The mechanical keyboard module includes a number of first mechanical keys located on the top cover and a number of second mechanical keys located on the bottom cover.

12 Claims, 6 Drawing Sheets

(56) References Cited

U.S. PATENT DOCUMENTS

| | | | |
|---|---|---|---|
| 2009/0131117 A1* | 5/2009 | Choi | G06F 1/1616 455/566 |
| 2012/0113012 A1* | 5/2012 | Cho | H04B 1/3888 345/169 |
| 2012/0115551 A1* | 5/2012 | Cho | H04M 1/23 455/566 |
| 2013/0149964 A1* | 6/2013 | Kreiner | G06F 1/1632 455/41.2 |
| 2013/0281155 A1* | 10/2013 | Ogata | H04B 1/3883 455/556.1 |
| 2014/0027256 A1* | 1/2014 | Park | H01H 13/7057 200/5 A |
| 2014/0055014 A1* | 2/2014 | Pan | H05K 5/02 312/223.2 |
| 2014/0071607 A1* | 3/2014 | Frinak | G06F 1/1624 361/679.09 |
| 2014/0097857 A1* | 4/2014 | Hu | G06F 3/044 324/661 |
| 2014/0210803 A1* | 7/2014 | Oh | G09G 3/20 345/207 |
| 2014/0211394 A1* | 7/2014 | Lin | G06F 1/1669 361/679.17 |
| 2014/0240257 A1* | 8/2014 | Yu | G06F 3/0412 345/173 |
| 2014/0266012 A1* | 9/2014 | Flynn | H04M 1/0214 320/107 |
| 2015/0229754 A1* | 8/2015 | Won | H04M 1/72563 455/575.8 |
| 2015/0270734 A1* | 9/2015 | Davison | H02J 7/0054 320/103 |
| 2015/0331605 A1* | 11/2015 | Park | G06F 3/0482 715/773 |
| 2015/0355877 A1* | 12/2015 | Kim | G06F 3/16 700/94 |
| 2016/0014258 A1* | 1/2016 | Hwang | H04M 1/72544 455/418 |
| 2016/0026219 A1* | 1/2016 | Kim | H04M 1/0245 345/173 |
| 2016/0044148 A1* | 2/2016 | Pizzo | H04M 1/026 455/575.8 |

* cited by examiner

MOBILE PHONE COVER WITH MECHANICAL KEYBOARD

FIELD

The subject matter herein generally relates to mobile phone covers, especially to a mobile phone cover with mechanical keyboard.

BACKGROUND

With development of science and technology, smart phones have become essential goods of life. User can call, chat and/or browse the Web via the smart phone. However, smart phones are using virtual keyboards currently. The virtual keyboards are always occupy parts of the phone screens. Each virtual key is basically accounted for a total of three or four-letters key. User cannot enter quickly using the virtual keyboard. Further, the gap between the virtual keys is very small, which causes to misuse easily.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
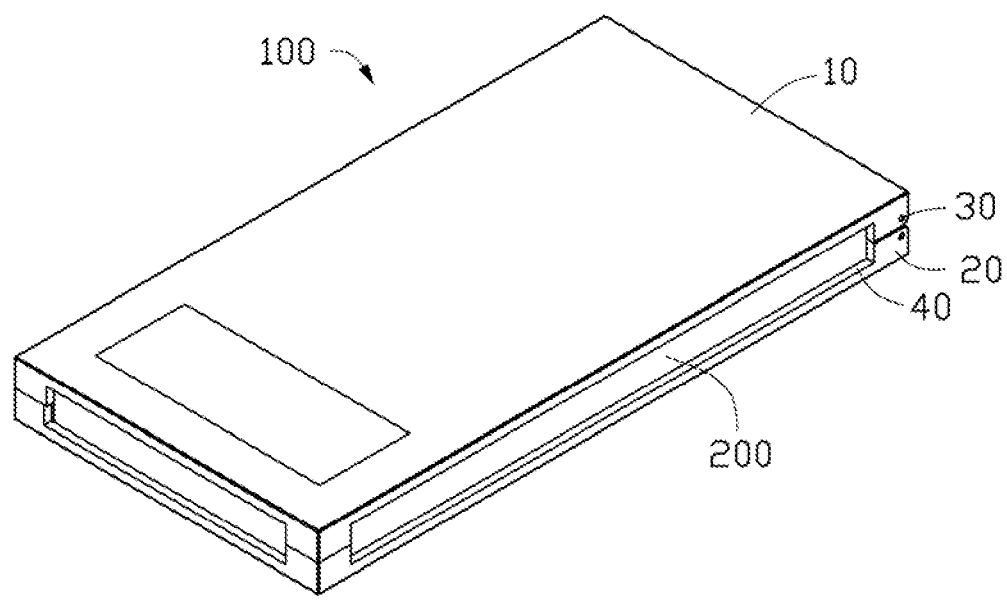
FIG. 1 is an isometric view of an embodiment of a mobile phone cover with mechanical keyboard.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
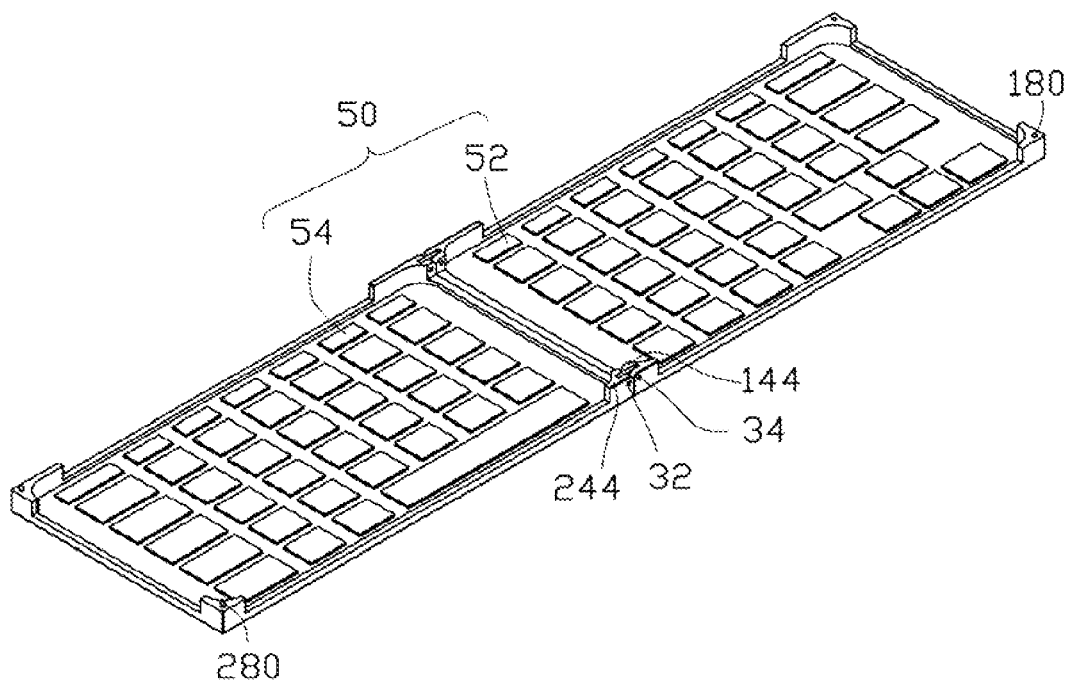
FIG. 2 is an isometric view of the embodiment of the mobile phone cover with mechanical keyboard shown in FIG. 1 in a first state of using.

FIG. 1 shows a mobile phone cover 100 and a mobile phone 200 received in the mobile phone cover 100. The mobile phone cover 100 can include a top cover 10, a bottom cover 20 and a connecting assembly 30 coupling the top cover 10 with the bottom cover 20. The top cover 10 and the bottom cover 20 can cooperatively form a receiving space 40. The mobile phone 200 can be received in the receiving space 40. Referring to FIG. 2, the mobile phone cover 100 can further include a mechanical keyboard module 50. The mechanical keyboard module 50 can include a number of first mechanical keys 52 located on the top cover 10 and a number of second mechanical keys 54 located on the bottom cover 20. In this embodiment, the mechanical keyboard module 50 can include a number of first mechanical keys 52 located on inner side of the top cover 10 and a number of second mechanical keys 54 located on inner side of the bottom cover 20.

Figure 3:
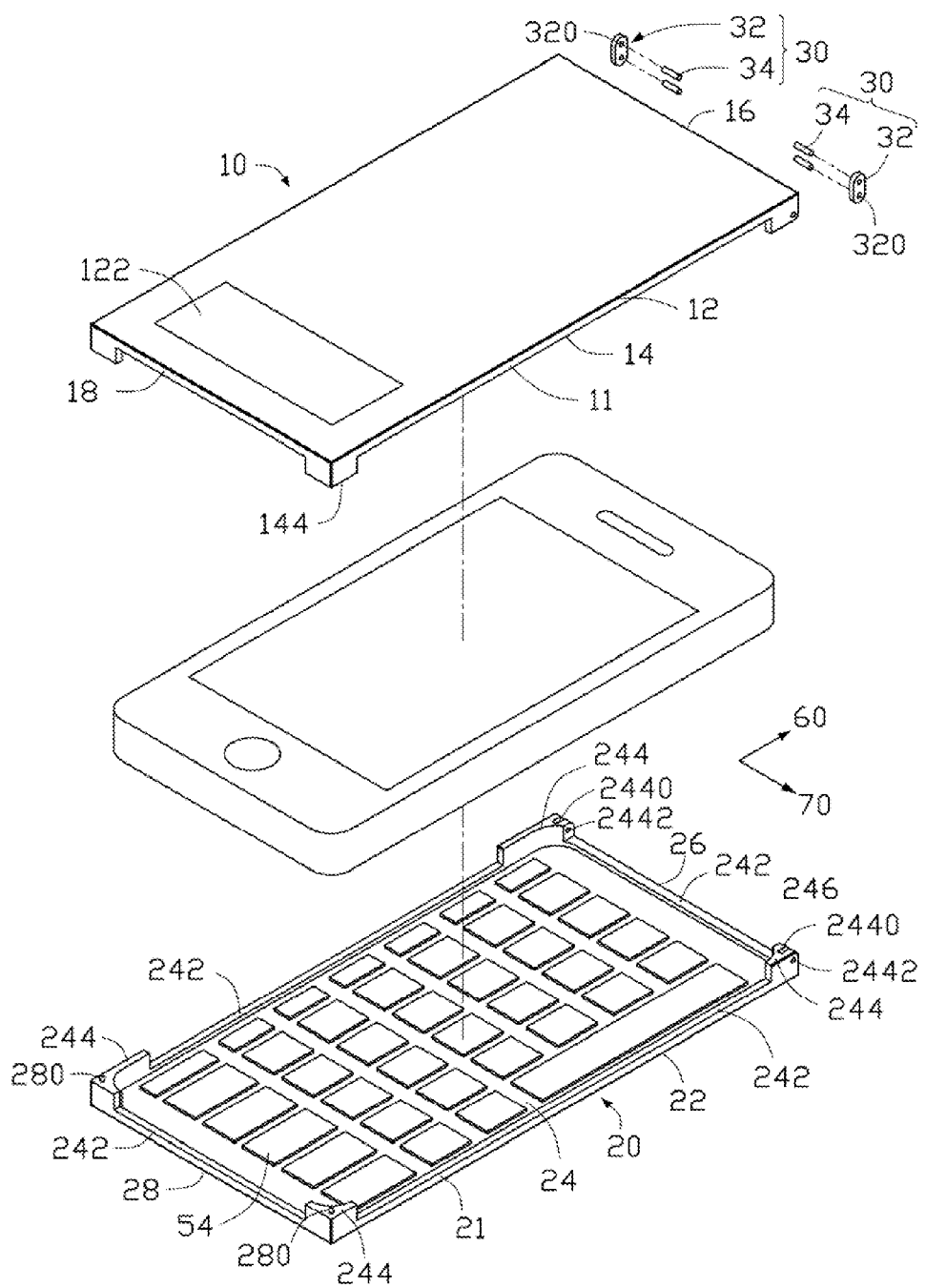
FIG. 3 is an exploded isometric view of the embodiment of the mobile phone cover shown in FIG. 1, and a mobile phone.
Figure 4:
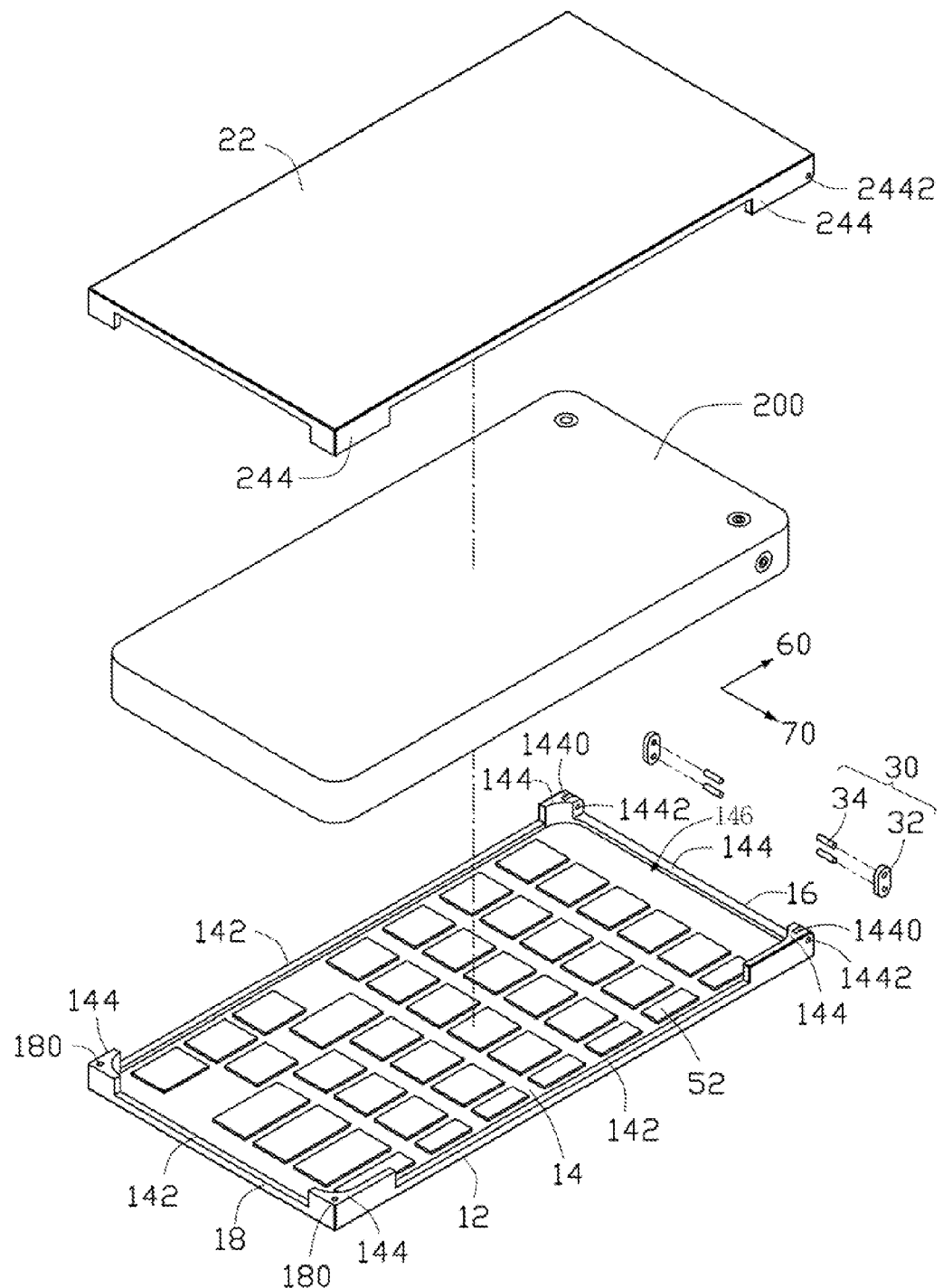
FIG. 4 is similar to FIG. 3, but viewed from another angle.

Referring to FIGS. 2, 3 and 4, the top cover 10 can include a top cover body 11. The top cover body 11 can have a first surface 12 and a second surface 14 opposite to and substantially parallel to the first surface 12. The first mechanical keys 52 can protrude from the second surface 14 and extend along a direction away from the first surface 12. The top cover body 11 can further have a first side 16 coupling the first surface 12 with the second surface 14, and a second side 18 opposite to the first side 16, substantially parallel to the first side 16, and coupling the first surface 12 with the second surface 14.

The top cover 10 can further include a display screen 122, four first peripheral sidewalls 142 and four supporting posts 144. The display screen 122 can be located on the first surface 12. The display screen 122 can be used to display but not limited to time and input characters. The four first peripheral sidewalls 142 can protrude out from a periphery of the second surface 14 and extend along the direction away from the first surface 12. Each supporting post 144 can protrude from a junction of the two adjacent first peripheral sidewalls 142. The second surface 14, the four first peripheral sidewalls 142 and the four supporting posts 144 can cooperatively form a first receiving space 146. The first mechanical keys 52 can protrude from the second surface 14 which is located in the first receiving space 146 and extend along the direction away from the first surface 12.

For brief description, a first direction 60 and a second direction 70 can be defined. The first direction 60 can be a direction perpendicular to the first side 16 and the second side 18. The second direction 70 can be a direction perpendicular to first direction 60 and parallel with first surface 12 of the top cover body 11.

The two supporting posts 14 are close to the first side 16. The other two supporting posts 144 are away from the first side 16. Each supporting post 144 close to the first side 16 can define a first accommodating space 1440 along the first direction 60 and a first axis hole 1442 substantially perpendicular to the first accommodating space 1440 and communicated with the first accommodating space 1440. Each supporting post 14 away from the first side 16 can define a groove 180.

The bottom cover 20 can include a bottom cover body 21. The bottom cover body 21 can have a third surface 22 and a fourth surface 24 opposite to and substantially parallel to the third surface 22. The second mechanical keys 54 can protrude from the fourth surface 24 and extend along a direction away from the third surface 22. The bottom cover body 21 can further have a third side 26 coupling the third surface 22 with the fourth surface 24, and a fourth side 28 opposite to the third side 26, substantially parallel to the third side 26, and coupling the third surface 22 with the fourth surface 24.

The bottom cover 20 can further include four second peripheral sidewalls 242 and four supporting portions 244. The four second peripheral sidewalls 242 can protrude from the fourth surface 24 and extend along the direction away from the third surface 22. Each supporting portion 244 can protrude from a junction of the two adjacent second peripheral sidewalls 242. The third surface 22, the four second peripheral sidewalls 242 and the four supporting portions 244 can cooperatively form a second receiving space 246. The second mechanical keys 54 can protrude from the fourth surface 24 which is located in the second receiving space 246 and extend along the direction away from the third surface 22.

The two supporting portions 244 can be close to the third side 26. The other two supporting portions 244 can be away from the third side 26. Each supporting portion 244 close to the third side 26 can define a second accommodating space 2440 along the first direction 60 and a second axis hole 2442 substantially perpendicular to the second accommodating space 2440 and communicated with the second accommodating space 2440. Each supporting portion 244 away from the third side 26 can define a protrusion 280.

The connecting assembly 30 can include two connecting blocks 32. Each connecting block 32 can define two axis holes 320. The two ends of each connecting block 32 can be rotatably received in the first accommodating space 1440 and the second accommodating space 2440 respectively. The connecting assembly 30 can further include two pairs of pivots 34. Each of one pair of pivots 34 can be rotatably received in one first axis hole 1442 and one axis hole 320 of the connecting block 32 such that the connecting block 32 can be coupled to the supporting post 144. Each of the other pair of pivots 34 can be rotatably received in one second axis hole 2442 and the other axis hole 320 of the connecting block 32 such that the connecting block 32 can be coupled to the supporting block 244. The top cover 10 can rotate about the axis of the pivot 34 received in the first axis hole 1442. The bottom cover 20 can rotate about the axis of the pivot 34 received in the second axis hole 2442.

When the protrusion 280 is received in the groove 180, the top cover 10 can be detachably engaged with the bottom cover 20. The receiving space 40 can be cooperatively formed by the first receiving space 146 and the second receiving space 246.

Referring to FIG. 2 again, in at least one embodiment, when an external keyboard is needed, the mobile phone 200 can be removed from the receiving space 40, the top cover 10 and the bottom cover 20 can be pulled towards opposite directions, such that the angle between the top cover 10 and the bottom cover 20 can be 180 degrees, at this time, the user can operate the first mechanical keys 52 via one hand and operate the second mechanical keys 54 via the other hand.

Figure 5:
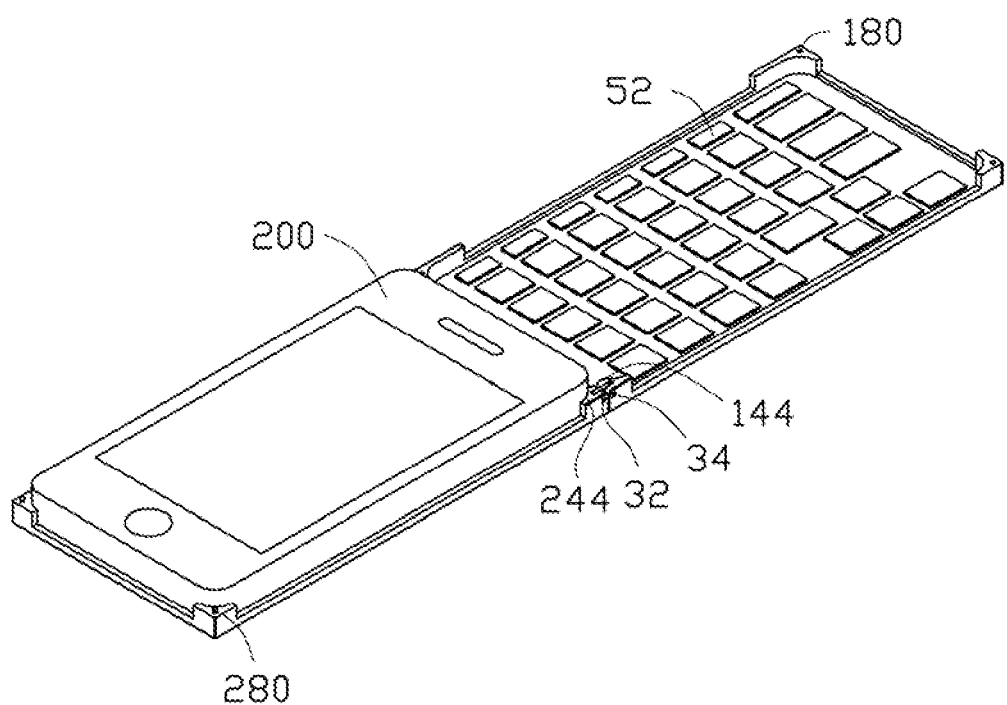
FIG. 5 is an isometric view of the embodiment of the mobile phone cover with mechanical keyboard shown in FIG. 1 in a second state of using.

Referring to FIG. 5, in at least one embodiment, it is not needed that the mobile phone 200 is removed from the receiving space 40. The top cover 10 or the bottom cover 20 can be pulled towards a direction such that the angle between the top cover 10 and the bottom cover 20 can be 180 degrees, at this time, the user can operate the first mechanical keys 52 or the second mechanical keys 54 via one hand.

Figure 6:
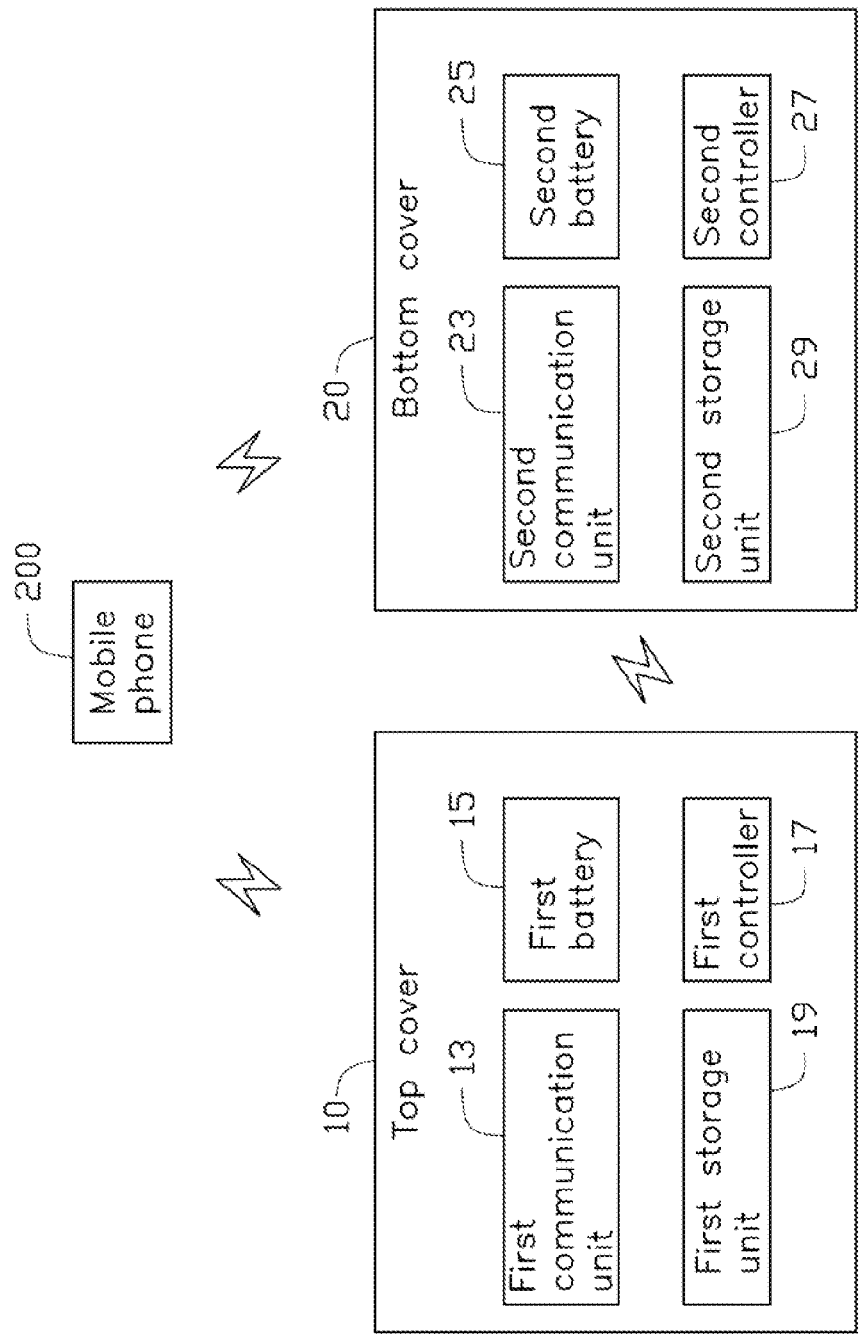
FIG. 6 is a block diagram of the embodiment of the mobile phone cover with mechanical keyboard shown in FIG. 1.

Referring to FIG. 6, the top cover 10 can include a first communication unit 13, and the bottom cover 20 can include a second communication unit 23. The top cover 10 can communicate with the bottom cover 20 with the first communication unit 13 and second communication unit 23. The top cover 10 can communicate with the mobile phone 200 via the first communication unit 13. The bottom cover 20 can communicate with the mobile phone 200 via the second communication unit 23. The first communication unit 13 and the second communication unit 23 can be a local area wireless communication module, such as WIFI, BLUETOOTH, or other suitable communication devices.

Referring to FIG. 2 again, in at least one embodiment, the locations of the first mechanical keys 52 can be different from the locations of the second mechanical keys 54. In detail, the first mechanical keys 52 are suitable for the left hand operating, and the second mechanical keys 54 are suitable for the right hand operating.

In at least one embodiment, the top cover 10 or the bottom cover 20 can include one or more mechanical keys having special functions. The mechanical keys can be one or more of the first mechanical keys 52 or second mechanical keys 54 or additional mechanical keys. The special functions can be opening the keyboard, closing the keyboard, answering the telephone, or handing up the telephone.

Referring to FIG. 6, in at least one embodiment, the top cover 10 can include a first battery 15 for powering the top cover 10. The bottom cover 20 can include a second battery 25 for powering the bottom cover 20.

In at least one embodiment, the top cover 10 can include a first controller 17 and a first storage unit 19. The first storage unit 19 can store a number of key codes corresponding to the number of first mechanical keys 52. The first controller 17 can recognize the input characters according to the number of key codes, and further control the display screen 200 to display the input characters thereon.

In at least one embodiment, the bottom cover 20 can include a second controller 27 and a second storage unit 29. The second storage unit 29 can store a number of key codes corresponding to the number of second mechanical keys 54. The second controller 27 can recognize the input characters according to the number of key codes, and further control the display screen 200 to display the input characters thereon.

In at least one embodiment, the first controller 17 and the second controller 27 can be a central processing unit, a digital signal processor, or a single chip, for example.

In at least one embodiment, the first storage unit 19 and the second storage unit 29 can be an internal storage system, such as a flash memory, a random access memory (RAM) for temporary storage of information, and/or a read-memory (ROM) for permanent storage of information.

In at least one embodiment, the first storage unit 19 and the second storage unit 29 can also be a storage system, such as a hard disk, a storage card, or a data storage medium. The first storage unit 19 and the second storage unit 29 can include volatile and/or non-volatile storage devices.

In at least one embodiment, the first storage unit 19 and the second storage unit 29 can include two or more storage devices such that one storage device is a memory and the other storage device is a hard drive. Additionally, the first storage unit 19 and the second storage unit 29 can be respectively located either entirely or partially external relative to the vehicle 100.

In at least one embodiment, the top cover 10 can include a data interface (not shown), and the bottom cover 20 can include a data interface (not shown). The top cover 10 can communicate with the bottom cover 20 via a data cable coupling the data interface of the top cover 10 with the data interface of the bottom cover 20. The top cover 10 can communicate with the mobile phone 200 via a data cable coupling the data interface of the top cover 10 with the data interface of the mobile phone 200. The bottom cover 20 can communicate with the mobile phone 200 via a data cable coupling the data interface of the bottom cover 20 with the data interface of the mobile phone 200.

The embodiments shown and described above are only examples. Many details are often found in the art such as the other features of mobile phone cover with mechanical keyboard. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A mobile phone cover comprising:
a top cover comprising a first communication unit;
a bottom cover comprising a second communication unit;
a connecting assembly coupling the top cover with the bottom cover; and
a mechanical keyboard module comprising:
  a plurality of first mechanical keys located on the top cover; and
  a plurality of second mechanical keys located on the bottom cover;
wherein the bottom cover and the top cover cooperatively form a receiving space for receiving a mobile phone, and the top cover communicates with the bottom cover via the first communication unit and the second communication unit.

2. The mobile phone cover of claim 1, wherein the top cover comprises a top cover body, the top cover body has a first surface and a second surface opposite to the first surface, the first mechanical keys protrude from the second surface and extend away from the first surface; the bottom cover comprises a bottom cover body, the bottom cover body has a third surface and a fourth surface opposite to the third surface, the second mechanical keys protrude from the fourth surface and extend away from the third surface.

3. The mobile phone cover of claim 2, wherein the top cover comprises four first peripheral sidewalls and four supporting posts, the four first peripheral sidewalls protrude from the second surface and extend away from the first surface, each supporting post protrudes from a junction of the two adjacent first peripheral sidewalls, the second surface, the four first peripheral sidewalls and the four supporting posts cooperatively form a first receiving space; the bottom cover comprises four second peripheral sidewalls and four supporting portions, the four second peripheral sidewalls protrude from the fourth surface and extend away from the third surface, each supporting portion protrudes from a junction of the two adjacent second peripheral sidewalls, the third surface, the four second peripheral sidewalls and the four supporting portions cooperatively form a second receiving space; the receiving space is formed by the first receiving space and the second receiving space.

4. The mobile phone cover of claim 3, wherein the top cover body has a first side coupling the first surface with the second surface; each supporting post close to the first side defines a first accommodating space along a first direction; the bottom cover body has a third side coupling the third surface with the fourth surface; each supporting portion close to the third side defines a second accommodating space along a first direction; the connecting assembly comprises two connecting blocks, each connecting block is rotatablely received in the first accommodating space and the second accommodating space respectively.

5. The mobile phone cover of claim 4, wherein each supporting post close to the first side defines a first axis hole perpendicular to the first accommodating space and communicated with the first accommodating space; each supporting portion close to the third side defines a second axis hole perpendicular to the second accommodating space and communicated with the second accommodating space; each connecting block defines two axis holes; the connecting assembly comprises two pairs of pivots; each of one pair of pivots is rotatablely received in the first axis hole and one axis hole of the connecting block such that the connecting block is coupled to the supporting post, each of the other pair of pivots is rotatablely received in the second axis hole and the other o axis hole of the connecting block such that the connecting block is coupled to the supporting block.

6. The mobile phone cover of claim 4, wherein each supporting post away from the first side defines a groove, each supporting portion away from the third side has a protrusion, when the protrusion is received in the groove, the top cover is engaged with the bottom cover.

7. The mobile phone cover of claim 2, wherein the top cover comprises a display screen located on the first surface, the display screen is configured to display but not limited to time and input characters.

8. The mobile phone cover of claim 1, wherein the first mechanical keys are suitable for a left hand operating, and the second mechanical keys are suitable for a right hand operating.

9. The mobile phone cover of claim 1, wherein the top cover or the bottom cover comprises one or more mechanical keys having special functions, the mechanical keys are one or more of the first mechanical keys or second mechanical keys or additional mechanical keys, the special functions are opening the keyboard, closing the keyboard, answering the telephone, or handing up the telephone.

10. The mobile phone cover of claim 1, wherein the top cover comprises a first battery for powering the top cover, and the bottom cover comprises a second battery for powering the bottom cover.

11. The mobile phone cover of claim 1, wherein the top cover comprises a first controller and a first storage unit, the first storage unit stores a plurality of key codes corresponding to the plurality of first mechanical keys, the first controller recognizes input characters according to the plurality of key codes.

12. The mobile phone cover of claim 1, wherein the bottom cover comprises a second controller and a second storage unit, the second storage unit stores a plurality of key codes corresponding to the plurality of second mechanical keys, the second controller recognizes the input characters according to the plurality of key codes.

* * * * *